United States Patent Office 3,329,694
Patented July 4, 1967

3,329,694
COLCHICINE INTERMEDIATES AND
PREPARATION THEREOF
Jacques Martel, Bondy, Seine, Edmond Toromanoff, Paris, and Chanh Huynh, Villemomble, Seine, France, assignors to Roussel-Uclaf, Paris, France, a corporation of France
No Drawing. Filed Mar. 31, 1964, Ser. No. 356,088
Claims priority, application France, Apr. 10, 1963, 931,090
13 Claims. (Cl. 260—410.9)

The invention relates to a novel process for the preparation of 2,3,4-trimethoxy-5-(2'-carboxyethyl)-8,9-dihydro-7-H-benzocycloheptene and its lower alkyl esters which are useful intermediates for the synthesis of colchicinic derivatives according to the process described in commonly assigned, copending United States application Ser. No. 356,048, filed Mar. 31, 1964, now Patent No. 3,280,151. The invention also relates to novel intermediates formed in the said process.

T. E. Acker in a 1960 doctorate thesis of Columbia University entitled "An Approach to the Synthesis of Colchicine" described a relatively laborious synthesis of 2,3,4-trimethoxy-5 - (2'-carboxyethyl) - 8,9-dihydro-7-H-benzocycloheptene with low yields. The said process consisted of cyclizing the ethyl ester of [3,4,5-trimethoxybenzoyl]-acetic acid to form 2,3,4-trimethoxy-6,7,8,9-tetrahydro-5-H-benzocycloheptene-5-one which required fixing in the 5-position an acetic acid chain which was lengthened into a carboxyethyl chain.

It is an object of the invention to provide a novel, economical process for the preparation of 2,3,4-trimethoxy-5-(2'-carboxyethyl)-8,9 - dihydro-7-H-benzocycloheptene with high yields.

It is another object of the invention to provide novel intermediates for 2,3,4 - trimethoxy-5-(2'-carboxyethyl)-8,9-dihydro-7-H-benzocycloheptene.

These and other objects and advantages of the invention will become obvious from the following detailed description.

The novel process of the invention for the preparation of 2,3,4-trimethoxy-5-(2'-carboxyethyl)-8,9-dihydro-7-H-benzocycloheptene and its lower alkyl esters of the formula

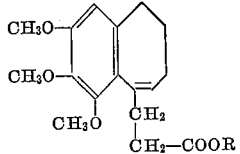

wherein R is selected from the group consisting of hydrogen and lower alkyl, comprises reacting 1-chloro-3-(3',4',5'-trimethoxyphenyl)-propane with an alkali metal iodide or bromide to form the corresponding 1-iodo or bromo-3-(3',4',5'-trimethoxyphenyl)-propane, condensing the latter with a dilower alkyl ester of β-keto adipic acid to form the dilower alkyl ester of 8-(3',4',5'-trimethoxyphenyl)-5-carboxy-4-oxo-octanoic acid, provoking a ketonic hydrolysis or decarboxylation of the latter to form 8-(3',4',5'-trimethoxyphenyl)-4-oxo-octanoic acid, esterifying the latter with a diazo lower alkane and cyclizing the resulting ester by heating in the presence of an anhydrous sulfonic acid to form 2,3,4-trimethoxy-5-(2'-carboalkoxyethyl)-8,9-dihydro-7-H-benzocycloheptene which can be saponified under alkaline conditions to form 2,3,4-trimethoxy-5-(2'-carboxyethyl)-8,9-dihydro-7 - H-benzocycloheptene.

The ketonic hydrolysis or decarboxylation of the dilower alkyl ester of 8-(3',4',5'-trimethoxyphenyl)-5-carboxy-4-oxo-octanoic acid may be effected with an alkaline agent such as an alkali metal hydroxide in the presence of a lower alkanol or by acidolysis with a diluted acid.

The final cyclization of the ester of 8-(3',4',5'-trimethoxyphenyl)-4-oxo-octanoic acid in the presence of an anhydrous sulfonic acid gives the desired acid benzocycloheptene in pure, crystalline form as compared to the oily, non-crystallized product obtained by the prior art. Examples of suitable sulfonic acids are lower alkyl sulfonic acids such as methyl sulfonic acid and aryl sulfonic acids such as benzene sulfonic acid and preferably p-toluene sulfonic acid, etc.

A preferred mode of the process for the preparation of 2,3,4-trimethoxy-5-(2'-carboxyethyl)-8,9-dihydro-7-H-benzocycloheptene comprises reacting 1-chloro-3-(3',4',5'-trimethoxyphenyl)-propane with sodium iodide in an organic solvent such as acetone to form 1-iodo-3-(3',4',5'-trimethoxyphenyl)-propane, condensing the latter with diethyl β-keto adipate to form the diethyl ester of 8-(3',4',5'-trimethoxyphenyl)-5-carboxy-4-oxo-octanoic acid, reacting the latter with methanolic sodium hydroxide to form 8-(3',4',5'-trimethoxyphenyl)-4-oxo octanoic acid, reacting the latter with diazomethane to form the methyl ester of 8-(3',4',5'-trimethoxyphenyl)-4-oxo octanoic acid, heating the latter in the presence of anhydrous p-toluene sulfonic acid to form 2,3,4-trimethoxy-5-(2'-carbomethoxyethyl)-8,9-dihydro-7-H-benzocycloheptene and saponifying the latter under alkaline conditions to form 2,3,4-trimethoxy-5-(2'-carboxyethyl)-8,9 - dihydro-7-H-benzocycloheptene. The reaction scheme is illustrated in Table I.

TABLE I

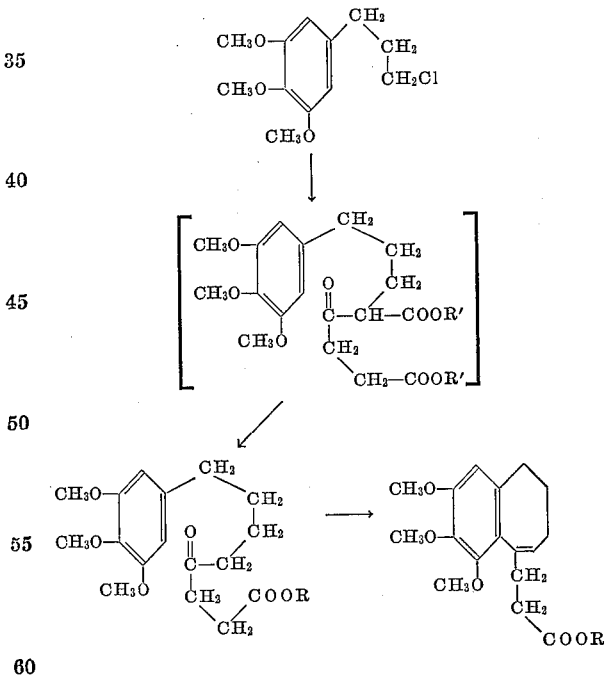

wherein R is selected from the group consisting of hydrogen and lower alkyl, and R' is a lower alkyl.

The novel process of the invention makes it possible to produce 2,3,4-trimethoxy-5-(2'-carboxyethyl)-8,9-dihydro-7-H-benzocycloheptene in a simple, rapid manner. The said process which has only one condensation and one cyclization permits the simultaneous placing of the heptenic ring and the carboxyethyl chain.

In the following example there are described several preferred embodiments to illustrate the invention. However, it should be limited to the specific embodiments.

EXAMPLE

*Preparation of 2,3,4-trimethoxy-5-(2'-carboxyethyl)-8,9-dihydro-7-H-benzocycloheptene*

*Step A: Preparation of 1-iodo-3-(3',4',5'-trimethoxyphenyl)-propane.*—69.7 gm. of 1-chloro-3-(3',4',5'-trimethoxyphenyl)-propane [described by Rappoport, J. Am. Chem. Soc. 73, 2239 (1951)] were dissolved in 426 cc. of anhydrous acetone. While agitating, 64.5 gm. of anhydrous sodium iodide were added and the reaction mixture was heated to reflux for a period of 18 hours while maintaining the agitation. Thereafter the reaction mixture was cooled and the sodium chloride formed was filtered and washed with anhydrous acetone. The acetonic solutions were combined and brought to dryness. The residue was taken up in anhydrous benzene and the sodium iodide was filtered off. The 1-iodo-3-(3',4',5'-trimethoxyphenyl)-propane thus obtained is not described in the literature.

*Step B: Preparation of the diethyl ester of 8-(3',4',5'-trimethoxyphenyl)-5-carboxy-4-oxo-octanoic acid.*—8.8 gm. of sodium in small pieces were dissolved under an atmosphere of nitrogen while agitating in a solution of 100 cc. of diethyl β-keto-adipate and 130 cc. of anhydrous benzene while the reaction mixture was heated to reflux. After total dissolution of the sodium, the iodic derivative prepared in Step A was added to the reaction mixture and the heating was maintained at reflux for a period of 6 hours. Thereafter the reaction mixture was allowed to stand at room temperature for a half day after which the insoluble mineral matter was filtered off and the filtrate was recovered in a dilute solution of hydrochloric acid. The aqueous phase was decanted and the benzenic solution was washed with N hydrochloric acid, then with water until the wash waters were neutral. Thereafter the organic phase was dried and the excess of diethyl β-keto-adipate was removed under vacuum to obtain the diethyl ester of 8-(3',4',5'-trimethoxyphenyl)-5-carboxy-4-oxo-octanoic acid which ester is new. This compound was utilized as such for the next step of the synthesis.

*Step C: Preparation of 8-(3',4',5'-trimethoxyphenyl)-4-oxo-octanoic acid.*—The diethyl ester prepared in Step B was dissolved in 250 cc. of methanol and after 65 cc. of sodium hydroxide solution and 65 cc. of water were added thereto, the reaction mixture was heated 1½ hours at reflux. Then, the methanol was evaporated under vacuum and water was added. The aqueous phase was extracted with ether and the extract was washed with water. The alkaline aqueous phase and the wash waters were combined, acidified with hydrochloric acid and extracted with methylene chloride. The methylene chloride extract was washed with saturated salt solution, dried and distilled to dryness. A residue was recovered which was taken up with a mixture of ether and isopropyl ether and after drying, 66.09 gm. of 8-(3',4',5'-trimethoxyphenyl)-4-oxo-octanoic acid were obtained in crystalline form.

For analysis, the said product was recrystallized from a mixture of acetone and isopropyl ether whereby the product occurred in the form of white crystals melting at 91° C. The product was insoluble in water and dilute aqueous acids and soluble in dilute alkalis, alcohols, acetone and chloroform.

*Analysis.*—$C_{17}H_{24}O_6$: molecular weight=324.36. Calculated: C, 62.95%; H, 7.46%; O, 29.60%. Found: C, 62.9%; H, 7.4%; O, 29.3%.

This compound is not described in the literature.

*Step D: Preparation of the methyl ester of 8-(3',4',5'-trimethoxyphenyl)-4-oxo-octanoic acid.*—60 gm. of 8-(3',4',5'-trimethoxyphenyl)-4-oxo-octanoic acid were dissolved while cooling to a temperature in the neighborhood of 5° C. in 200 cc. of methylene chloride. An excess of diazomethane in solution in methylene chloride was added thereto and the reaction mixture was allowed to stand for a period of 10 minutes. The excess of diazomethane was decomposed by acetic acid and the reaction mixture was washed successively with water, with sodium bicarbonate solution, with water, dried and evaporated to dryness to obtain 63 gm. of the methyl ester of 8-(3',4',5'-trimethoxyphenyl)-4-oxo-octanoic acid.

The product obtained was a liquid and was insoluble in water, dilute aqueous acids and alkalis and soluble in alcohols, ether, acetone, benzene and chloroform.

This compound is not described in the literature.

*Step E: Preparation of 2,3,4-trimethoxy-5-(2'-carbomethoxyethyl)-8,9-dihydro-7-H-benzocycloheptene.*—56 gm. of p-toluene sulfonic acid were dissolved in 900 cc. of benzene and the benzene was azeotropically distilled while maintaining the volume constant to the starting volume. An orange colored solution was obtained to which 50 gm. of the methyl ester of 8-(3',4',5'-trimethoxyphenyl)-4-oxo-octanoic acid dissolved in 100 cc. of anhydrous benzene were added. The reaction mixture was heated for a period of 16 hours at reflux and thereafter, the reaction mixture was cooled and some iced water added. The aqueous phase was decanted and extracted with benzene. The combined organic phases were washed with water and dried. The benzene was evaporated under vacuum and 50 gm. of product were obtained. The product was treated with 50 gm. of Grignard reactive T in 500 cc. of absolute ethanol and 50 cc. of acetic acid. This mixture was heated for one hour at reflux and poured into a half liter of iced water containing 75 cc. of sodium hydroxide solution. The aqueous mixture was extracted with ether and the extract was washed with water, with a solution of sodium bicarbonate, with water, dried and distilled to dryness to obtain 40.4 gm. of 2,3,4-trimethoxy-5-(2'-carbomethoxyethyl)-8,9-dihydro-7-H-benzocycloheptene having a boiling point at 0.5 mm. of mercury of 170–172° C.

The product was insoluble in water and dilute aqueous acids and alkalis and soluble in alcohols, ether, benzene and chloroform.

*Analysis.*—$C_{18}H_{24}O_6$: molecular weight=320.37. Calculated: C, 67.48%; H, 7.55%. Found: C, 67.9%; H, 7.4%.

This compound was identical to the product described by T. E. Acker, Columbia University 1960, "An Approach to the Synthesis of Colchicine."

*Step F: Preparation of 2,3,4-trimethoxy-5-(2'-carboxyethyl)-8,9-dihydro-7-H-benzocycloheptene.*—39 gm. of 2,3,4-trimethoxy-5-(2'-carbomethoxyethyl)-8,9-dihydro-7-H-benzocycloheptene were dissolved in a mixture of 300 cc. of methanol, 40 cc. of water and 27 cc. of sodium hydroxide solution and the reaction mixture was heated one hour at reflux. Then the methanol was removed and the reaction mixture was poured into water. The aqueous mixture was extracted with ether and the ethereal extract was washed with water. The alkaline aqueous phase and the wash waters were combined, acidified with 2 N hydrochloric acid solution and extracted with methylene chloride. The organic extract was washed with water, dried and distilled to dryness to obtain 38 gm. of a product which upon crystallization from hexane gave 25.51 gm. of 2,3,4-trimethoxy-5-(2'-carboxyethyl)-8,9-dihydro-7-H-benzocycloheptene.

The said product was recrystallized from isopropyl ether to obtain a purified product in the form of white rodlets which had a melting point of 72° C. The product was insoluble in water and dilute aqueous acids and soluble in dilute aqueous alkalis, alcohols, acetone, benzene and chloroform.

*Analysis.*—$C_{17}H_{22}O_5$: molecular weight=306.35. Calculated: C, 66.65%; H, 7.24%. Found: C, 67.1%; H, 7.5%.

This compound was identical to the product described (2'-carboxyethyl)-8,9-dihydro-7-H-benzocycloheptene. to the Synthesis of Colchicine."

Various modifications of the process of the invention may be made without departing from the spirit or scope thereof, and it is to be understood that the invention is to be limited only as defined in the appended claims.

It is to be understood that the novel process of the invention can be effected starting from compounds having other ethers on the aromatic ring instead of the trimethylether.

Otherwise it is to be understood that the reaction of 1-chloro-3-(3',4',5'-trimethoxyphenyl)-propane may also be effected with a silver sulfonate, such as silver p-toluene sulfonate instead of an alkali metal iodide or bromide so as to give the corresponding 1-fulfonate-3-(3',4',5'-trimethoxyphenyl)-propane which has to be condensed with a dilower alkyl ester of β-keto adipic acid.

We claim:

1. A process for the preparation of a lower alkyl ester of 2,3,4-trimethoxy-5-(2'-carboxyethyl)-8,9-dihydro-7-H-benzocycloheptene which comprises reacting 1-chloro-3-(3',4',5'-trimethoxyphenyl)-propane with a halide selected from the group consisting of alkali metal iodides and alkali metal bromides to form the corresponding 1-halo-3-(3',4',5'-trimethoxyphenyl)-propane, wherein halo is selected from the group consisting of iodo and bromo, condensing the latter with a dilower alkyl ester of β-keto adipic acid in the presence of an alkali metal to form the dilower alkyl ester of 8-(3',4',5'-trimethoxyphenyl)-5-carboxy-4-oxo-octanoic acid, effecting a ketonic hydrolysis of the latter to form 8-(3',4',5'-trimethoxyphenyl)-4-oxo-octanoic acid, reacting the latter with a diazo lower alkane to form the corresponding lower alkyl ester of 8-(3',4',5'-trimethoxyphenyl)-4-oxo-octanoic acid and cyclizing the latter by heating in the presence of an anhydrous sulfonic acid to form the lower alkyl ester of 2,3,4-trimethoxy-5-(2'-carboxyethyl)-8,9-dihydro-7-H-benzocycloheptene.

2. The process of claim 1 wherein the lower alkyl ester of 2,3,4-trimethoxy-5-(2'-carboxyethyl)-8,9-dihydro-7-H-benzocycloheptene is saponified under alkaline conditions to form 2,3,4-trimethoxy-5-(2'-carboxyethyl)-8,9-dihydro-7-H-benzocycloheptene.

3. The process of claim 1 wherein the halide is an alkali metal iodide.

4. The process of claim 1 wherein the dilower alkyl ester of β-keto adipic acid is the diethyl ester.

5. The process of claim 1 wherein the ketonic hydrolysis is effected with an alkali metal hydroxide in a lower alkanol.

6. The process of claim 1 wherein the ketonic hydrolysis is effected by acidolysis with a dilute acid.

7. The process of claim 1 wherein the diazo lower alkane is diazomethane.

8. The process of claim 1 wherein the anhydrous sulfonic acid is p-toluene sulfonic acid.

9. A process for the preparation of 2,3,4-trimethoxy-5-(2'-carbomethoxyethyl)-8,9-dihydro-7 - H-benzocycloheptene which comprises reacting 1-chloro-3-(3',4',5'-trimethoxyphenyl)-propane with sodium iodide to form 1-iodo-3-(3',4',5'-trimethoxyphenyl)-propane, condensing the latter with the diethyl ester of β-keto adipic acid in the presence of an alkali metal to form the diethyl ester of 8-(3',4',5'-trimethoxyphenyl)-5-carboxy-4-oxo-octanoic acid, reacting the latter with a methanolic sodium hydroxide to form 8-(3',4',5'-trimethoxyphenyl)-4-oxo-octanoic acid, reacting the latter with diazomethane to form the methyl ester of 8-(3',4',5'-trimethoxyphenyl)-4-oxo-octanoic acid and cyclizing the latter by heating in the presence of anhydrous p-toluene sulfonic acid to form 2,3,4-trimethoxy-5-(2'-carbomethoxyethyl)-8,9-dihydro - 7-H - benzocycloheptene.

10. The process of claim 9 wherein 2,3,4-trimethoxy-5-(2'-carbomethoxyethyl)-8,9-dihydro - 7 - H-benzocycloheptene is saponified under alkaline conditions to form 2,3,4-trimethoxy-5-(2'-carboxyethyl)-8,9-dihydro - 7 - H-benzocycloheptene.

11. A compound selected from the group consisting of 8-(3',4',5'-trimethoxyphenyl)-4-oxo-octanoic acid and its lower alkyl esters.

12. The methyl ester of 8-(3',4',5'-trimethoxyphenyl) 4-oxo-octanoic acid.

13. 8-(3',4',5'-trimethoxyphenyl)-4-oxo-octanoic acid.

References Cited

Nasipuri et al.: "Synthesis of Seven Membered Ring Compounds," Jour. Indian Chem. Soc., vol. 37, No. 6 (1960), pp. 369–375.

LORRAINE A. WEINBERGER, *Primary Examiner.*

S. B. WILLIAMS, Jr., *Assistant Examiner.*